United States Patent [19]

Anderson et al.

[11] 4,295,044

[45] Oct. 13, 1981

[54] BEVERAGE FLOW SWITCH

[75] Inventors: Kenneth W. Anderson, Fremont, Calif.; Brent Summerhays, Logan, Utah; Verl O. Cazier, Lander, Wyo.

[73] Assignee: Electronic Systems Engineering, Inc., Logan, Utah

[21] Appl. No.: 167,273

[22] Filed: Jul. 9, 1980

Related U.S. Application Data

[63] Continuation of Ser. No. 927,200, Jul. 24, 1978, abandoned.

[51] Int. Cl.³ ............................................. G01D 5/34
[52] U.S. Cl. .................................. 250/229; 73/861.74
[58] Field of Search .............. 73/194 E, 228; 250/229, 250/231 R; 340/606, 610

[56] References Cited

U.S. PATENT DOCUMENTS

| | | | |
|---|---|---|---|
| 1,776,297 | 9/1930 | Sanderson | 73/228 |
| 1,967,018 | 7/1934 | Bohner | 73/228 |
| 2,316,255 | 4/1943 | Knobel et al. | 73/228 |
| 3,814,935 | 6/1974 | Kissel | 250/231 R |
| 3,914,994 | 10/1975 | Banner | 73/228 |

Primary Examiner—David C. Nelms
Attorney, Agent, or Firm—H. Ross Workman; J. Winslow Young; Allen R. Jensen

[57] ABSTRACT

A flow switch apparatus and method for use in determining the quantity of a beverage liquid passing through a conduit, the apparatus including a light path across the conduit and an actuator arm interposed across the light path, the actuator arm being activated by fluid flow through the conduit. The light path is formed by a light source transmitting light toward a light detector. The light detector produces an electronic signal when adequate light received by the light detector. The signal produced by the switch apparatus is in the form of digital logic voltage levels which can be monitored remotely by conventional electronic apparatus to accumulate the flow information provided by the flow switch. The conduit is adapted to be vertically oriented to accommodate the actuator arm resting under gravity in occulusion of the light path when there is no fluid flow in the conduit.

9 Claims, 3 Drawing Figures

BEVERAGE FLOW SWITCH

This is a continuation of application Ser. No. 927,200, filed July 24, 1978, now abandoned.

This patent application also includes a Disclosure Document filed as No. 069658 on March 27, 1978.

BACKGROUND

1. Field of the Invention

The present invention relates to metering a liquid and, more particularly, to a switch method and apparatus for use in indicating precisely the quantity of liquid passing through a conduit.

2. The Prior Art

Precise inventory control for various establishments which dispense liquid beverages is notoriously imprecise to the substantial financial detriment of the owner. The problems experienced by tavern owners and others who dispense beverages such as draft beer and the like through a tap well-known in the art. In particular, substantial loss of profits results from the common practice of employees dispensing beverages for themselves, friends, acquaintences, and other non-paying customers without recording the transaction in the usual manner. Accordingly, it has been found that the recordation of cash receipts does not accurately reflect the volume of beverage dispensed over a predetermined period of time. Historically, the only technique by which tavern owners have been able to determine the volume of draft beer dispensed from a keg has been through highly inaccurate and unreliable methods such as grossly estimating the amount of beer dispensed or, alternatively determining the fluid level in the keg through percussion of the exterior.

That the need to monitor beverages or other liquids dispensed for purposes of inventory and control is adequately demonstrated by U.S. Pat. Nos. 628,312; 1,222,502; 2,721,702; and 3,467,279.

Furthermore, it has recently become technologically possible and economically desirable to dispense premixed beverages including alcholic beverages and soft drinks from taps connected to large-volume containers. In view of the foregoing, it would, therefore, be an advancement in the art to provide an apparatus and method for the precise measurement of the volume of beverage dispensed through a conduit. Such an apparatus and method is disclosed and claimed herein.

BRIEF SUMMARY AND OBJECTS OF THE INVENTION

The present invention relates to a novel flow switch apparatus and method for use in accurately determining the volume of fluid dispensed through a conduit. A light path is formed across the conduit between a light source on one side of the conduit and a light detector on the other side of the conduit. A pivotally mounted, gravitationally dependent actuator arm is interposed across the light path. The flow of liquid through the conduit raises the actuator arm from a blocking position across a light path. Light received by the light detector initiates an electronic signal by the light detector and triggers an amplifier circuit to provide a digital signal. The electronic signal generated by the flow switch may be electronically accumulated to provide an accurate determination of the amount of liquid flowing through the conduit.

It is, therefore, a primary object of this invention to provide improvements in flow switches.

Another object of this invention is to provide an improvement in the method of indicating when liquid is flowing throgh a conduit.

Another object of this invention is to provide a flow switch which can be interconnected in a conduit to provide an accurate indication when liquid is flowing through the conduit.

Another object of this invention is to provide a flow switch wherein the actuator arm for the flow switch is gravity dependent thereby eliminating the requirement for springs or other devices which could interfere with long term accuracy of the flow switch.

Another object of this invention is to provide a flow switch wherein movement of an actuator arm is detected by a light detector to provide an electronic signal corresponding to movement of the actuator arm.

Another primary object of this invention is to provide flow switch apparatus and method accommodating improved management of beverage dispensing methods.

These and other objects and features of the present invention will become more fully apparent from the following description and appended claims taken in conjunction with the accompanying drawing.

DETAILED DESCRIPTION OF THE PREFERRED EMBODIMENT

Figure 1:
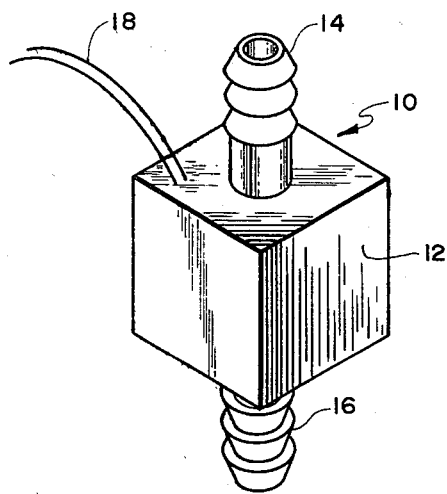
FIG. 1 is a perspective view of the overall flow switch apparatus of this invention.

The invention is best understood by reference to the drawing where in like parts are designated with like numerals throughout.

Referring now more particularly to FIG. 1, the beverage flow switch of this invention is shown herein generally at 10 and includes a housing 12 enclosing a portion of a conduit having connectors 14 and 16 thereon. Electrical leads 18 provide the necessary electrical coupling and output signal for the electrical circuitry (FIG. 3) embedded within housing 12. Importantly, beverage flow switch 10 is configured to be interconnected in a conventional beverage flow conduit (not shown).

Figure 2:
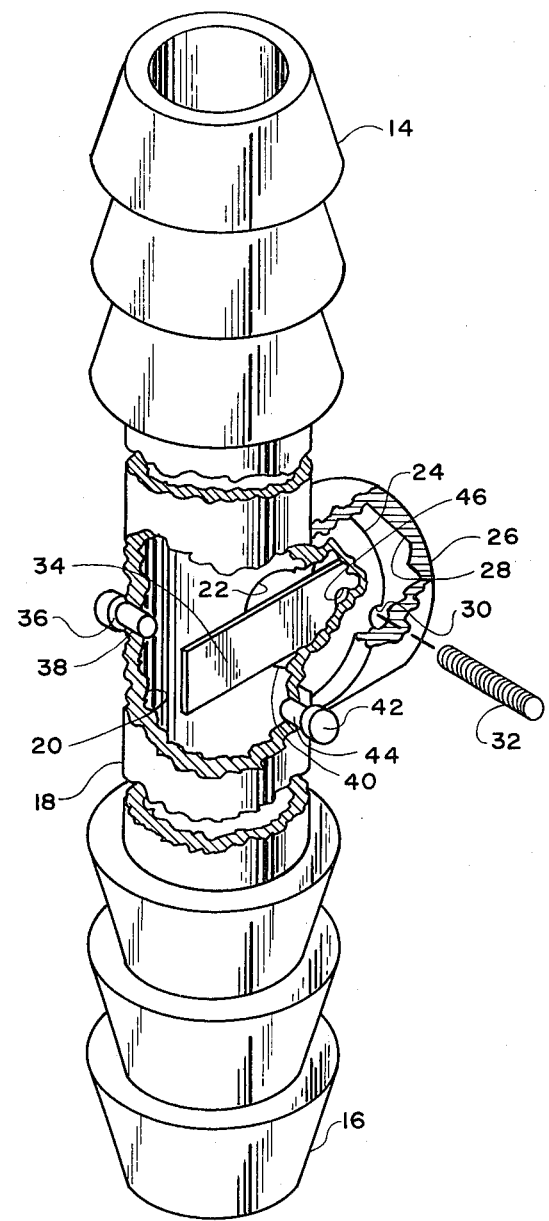
FIG. 2 is a partial perspective view of the flow switch of this invention with portions broken away to reveal internal structure.

Referring now more particularly to FIG. 2, the actuator portions of the flow switch apparatus of this invention are illustrated more fully and include a conduit 18 interconnecting each of couplings 14 and 16. Conduit 18 is shown broken adjacent each of couplings 14 and 16 to foreshorten the illustration of FIG. 2 while retaining the interrelationship between couplings 14 and 16 with conduit 18. Conduit 18 is configured as a hollow conduit having a throughbore 20 through which beverage (not shown) flows. A cavity 22 is formed as a side branch of throughbore 20 and serves as an enclosure for an acturator arm 34. Cavity 22 is the hollow section of a short, side branch or rim 24 formed on the side wall of conduit 18. Rim 24 is an integral part of conduit 18 and serves as a pivotal support for actuator arm 34 by forming a pivot recess 30 on opposed edges thereof. Pivot recess 30 is configured as a semicircular recess in the leading edge of rim 24 and is adapted to receive therein a pivot pin 32. Pivot pin 32 passes through an aperture 46 in actuator arm 34 and is held against pivot recess 30 by a cap 26 matingly engaged with rim 24. Cap 26 sealingly encloses the end of cavity 22 and is countersunk with a countersink 28 in such a manner that the internal surface of cap 26 presses against pivot pin 32 to hold pivot pin 32 in recess 30 while the center of the countersunk portion allows free movement of actuator arm 34.

Actuator arm 34 is adapted to extend from cavity 22 transversley into throughbore 20 with the plane of actuator arm 34 being parallel and passing through the axis of conduit 18. Importantly, actuator arm 34 is adapted to rest against a lower lip 40 of cavity 22 under the action of gravity when conduit 18 is oriented vertically with connector 14 directed upwardly. In this position, actuator arm 34 occludes a light path be formed between a light source 36 and a light detector 42 while being free to be lifted upwardly about pivot pin 32. Actuator arm 34 is fabricated from a suitable plastic material having sufficient specific gravity to rest against lip 40 when liquid (not shown) is static in conduit 18. As a tap (not shown) is opened, liquid flows upwardly through conduit 18 causing actuator arm 34 to be lifted vertically by the force of the liquid flow.

Light source 36 is indicated schematically herein and is sealingly inserted into an aperture 38 in conduit 18 so as to provide a light source to direct light across throughbore 20 toward light detector 42. Light detector 42 is also indicated schematically and embedded in an aperture in the sie wall of conduit 18 at a position diametrically opposed to light source 36. Light detector 42 receives light through the light detector sensor 44 when actuator arm 34 is raised from its resting position on lip 40 by the flow of liquid (not shown) upwardly through throughbore 20. Light source 36 may be any suitable light source and may, advantageously, be a light emitting diode (LED) whereas light detector 42 can be any suitable light detector including, for example, a photodetector known commercially in the trade as a photodarlington transistor.

Substantially all of the materials of construction of the flow meter apparatus of FIG. 2 can be fabricated from a plastic or other suitable material which is sufficiently opaque to prevent extraneous light from being detected by light detector 42. Furthermore, for applications involving beverages for human consumption, the materials for construction should be of a suitable food grade material and which will withstand required periodic cleaning.

Figure 3:
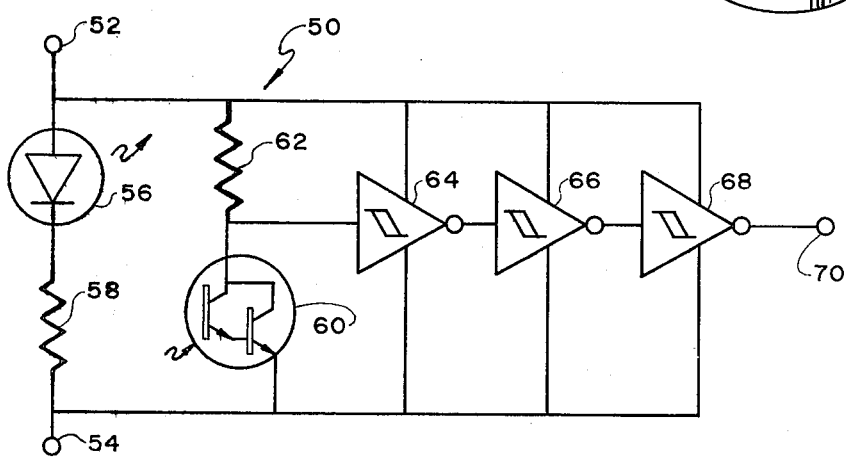
FIG. 3 is a diagram of one presently preferred electronic circuit for the flow switch of this invention.

Referring now more particularly to FIG. 3, one preferred embodiment of the electronic circuitry suitable for operation of this invention is shown herein generally at 50 and includes contacts 52 and 54 connected across a suitable power supply. For example, the circuit of this invention has been shown to operate reliably on a voltage of five volts to ground at about 20 milliampheres. Advantageously, the power supply intended to be used with this circuit can suitably incorporate current foldback to insure against any heating damage due to shorted wiring at the flow switch 10 (FIG. 1). This is particularly important when a beverage such as beer (not shown) is being monitored by the flow switch apparatus of this invention and when the circuit 50 is potted within housing 12 (FIG. 1).

The components of the circuit 50 include a light emitting diode 56 serving as light source 36 (FIG. 2), resistors 58 and 62 and a phototransistor 60 serving as light detector 42 (FIG. 2). Coupled within the circuit are inverter amplifiers or transsitors 64, 66 and 68 which form a conventional CMOS Schmitt trigger which can be purchased commercially as an integrated circuit known in the trade under standard designation as a 74C14 integrated circuit. Signal output from the circuit 50 is provided through contact 70. Contact 70 is interconnected to an electrical lead in conjunction with electrical leads 52 and 54 through the electrical leads illustrated schematically at 18 (FIG. 1).

In operation of the circuit 50, insufficient light reaching the photodetector 60 causes its output voltage to rise above the position switching threshold voltage of the CMOS schmitt trigger. This voltage is buffered and used as a first logic output level. When sufficient light reaches the photodetector 60 it causes the negative switching threshold volage of the CMOS schmitt trigger to be reached. This voltage is also buffered and used for the second logic output level. Accordingly, the flow switch apparatus of this invention operates as an on-off switch assembly to provide an electronic signal which is provided in the form of digital logic voltage levels. These voltage levels are monitored by a remote control apparatus (not shown) which electronically accummulates the flow information, and may, advantageously, decode and display the same in a positive readout in the form of ounces delivered, or the like.

Referring again to FIG. 2, in operation, conduit 18 (FIG. 2) is oriented vertically and, in the absence of fluid flow through conduit 18, actuator arm 34 rests against lip 40 blocking direct light from light source 36 reaching light detector 42. When liquid beverage flows upwardly through conduit 18, actuator arm 34 is raised out of the light path between light source 36 and light detector 42. The light received by light detector 42 causes the negative switching threshold voltage of the trigger assembly to be reached, this voltage being buffered and used for the second logic output level. The components and the values of the various components chosen offer a wide range of accuracy for variations in fluid transparency and while permitting reliable operation in electrical noisy environments.

The invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All claims that come within the meaning and range of equivalency of the claims are to be embraced within their scope.

What is claimed and desired to be secured by a United States Letters Patent is:

1. A flow switch comprising
vertical conduit means having a lower, inlet means and an upper, outlet means;
a light path transecting the conduit means;
an open chamber extending outwardly from a side of the vertical conduit means and having an open end and a closed end with the open end providing an unobstructed opening into the vertical conduit means;
a stop means in the lower side of the open end of the open chamber;
pivotal mounting means in the open chamber adjacent the closed end of the open chamber;
an actuator arm pivotally mounted on the pivotal mounting means and extending into the vertical conduit means and resting against the stop, the actuator arm thereby extending horizontally into the vertical conduit means in obstruction of the light path, the actuator arm thereby being adapted to be moved upwardly from obstruction of the light path by flow of a liquid upwardly through the vertical conduit means between the lower, inlet means to the upper, outlet means, the actuator arm being adapted to be urged downwardly against the stop and across the light path by gravitational forces;

a light source on a first side of the vertical conduit means for transmitting light into the light path;

light detector means on a second side of the vertical conduit means for detecting light transmitted through the light path as the actuator arm is moved upwardly from obstruction of the light path as a result of upward light flow through the vertical conduit means; and circuit means for electronically amplifying an electronic signal generated by the light detector means as a function of liquid flow through the vertical conduit means.

2. The flow switch defined in claim 1 wherein the pivotal mounting means comprises horizontal, opposed apertures in the walls of the open chamber for receipt of a pivotal pin, the pivot pin pivotally supporting the actuator arm.

3. The flow switch defined in claim 1 wherein the light source comprises a light emitting diode.

4. The flow switch defined in claim 1 wherein the light detector means comprises a photo transistor.

5. A beverage flow switch comprising:

a vertically oriented conduit having a lower inlet means and an upper outlet means;

an open chamber on the side of the conduit and having an opening into the conduit and a closed end;

a bottom edge to the opening into the conduit;

pivot means in the open chamber adjacent the closed end;

closure means for the closed end of the open chamber;

an actuator arm pivotally mounted at a first end on the pivot means in the chamber and extending a second end horizontally into the conduit, the actuator arm being freely movable in a vertical plane about the pivot means under flow of a liquid upwardly through the conduit and resting under gravitational forces on said bottom edge of the opening;

a light path across the conduit, the light path being transected by the actuator arm when the actuator arm is resting on the bottom edge of the opening;

light emitting means for transmitting light into the light path;

light detector means for detecting light passing through the light path; and electronic circuit means for providing a signal as a function of the light detected by the light detector means.

6. The beverage flow switch defined in claim 5 wherein the conduit includes couplings on each side of the flow switch to adapt the flow switch to be interposed in a beverage tubing.

7. The beverage flow switch defined in claim 5 wherein the open chamber is configured as a hollow throughbore in a side arm of the conduit and the closure means comprises a cap on the side arm.

8. The beverage flow switch defined in claim 5 wherein the actuator arm is configured as an elongated, planar element adapted to be inserted horizontally into the conduit through the open chamber with the plane of the actuator arm parallel to the axis of the conduit.

9. A method for electronically indicating when liquid is flowing through a conduit comprising:

vertically orienting at least a portion of the conduit;

interposing a light path across the vertical portion of the conduit;

inserting a light source in the conduit on a first end of the light path to transmit light into the light path;

placing a light detector on the second end of the light path to detect light passing through the light path;

providing an open, side chamber to the vertical portion of the conduit;

placing a pivotal mounting means in the open, side chamber;

enclosing the side chamber opposite the conduit with a closure means;

pivotally mounting an actuator arm on the pivotal mounting means with a portion of the actuator arm extending unobstructed through the opening of the open, side chamber into the conduit in a horizontal position thereby blocking light in the light path from reaching the light detector when no liquid is flowing through the conduit, the actuator arm resting under gravity against the bottom of the opening of the open side chamber and in the horizontal, blocking position, the actuator arm raising from the light path when liquid is flowing upwardly through the conduit, the flowing liquid raising the actuator arm; and generating an electronic signal with the light detector by light passing from the light source through the light path to the light detector upon flowing liquid raising the actuator arm from blocking the light path.

* * * * *

UNITED STATES PATENT AND TRADEMARK OFFICE
CERTIFICATE OF CORRECTION

PATENT NO. : 4,295,044

DATED : October 13, 1981

INVENTOR(S) : Kenneth W. Anderson, et al.

It is certified that error appears in the above-identified patent and that said Letters Patent are hereby corrected as shown below:

Column 1, line 21, after "tap" insert --are--
Column 2, line 5, "throgh" should be --through--
Column 2, line 63, "acturator" should be --actuator--
Column 3, line 31, "sie" should be --side--
Column 4, line 2, "transsitors" should be --transistors--
Column 4, line 13, "position" should be --positive--

Signed and Sealed this

Sixteenth Day of February 1982

[SEAL]

Attest:

GERALD J. MOSSINGHOFF

*Attesting Officer*    *Commissioner of Patents and Trademarks*